Aug. 9, 1966  C. I. PADDOCK  3,265,407
SAFETY CHAIN FOR TRAILERS
Filed Sept. 2, 1964
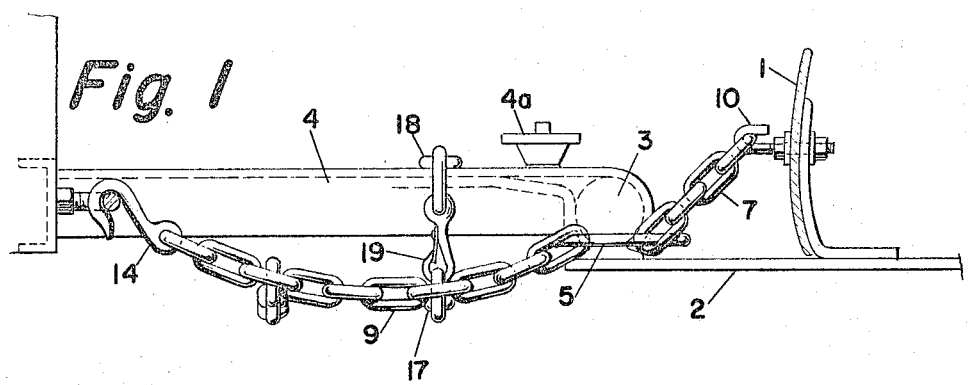
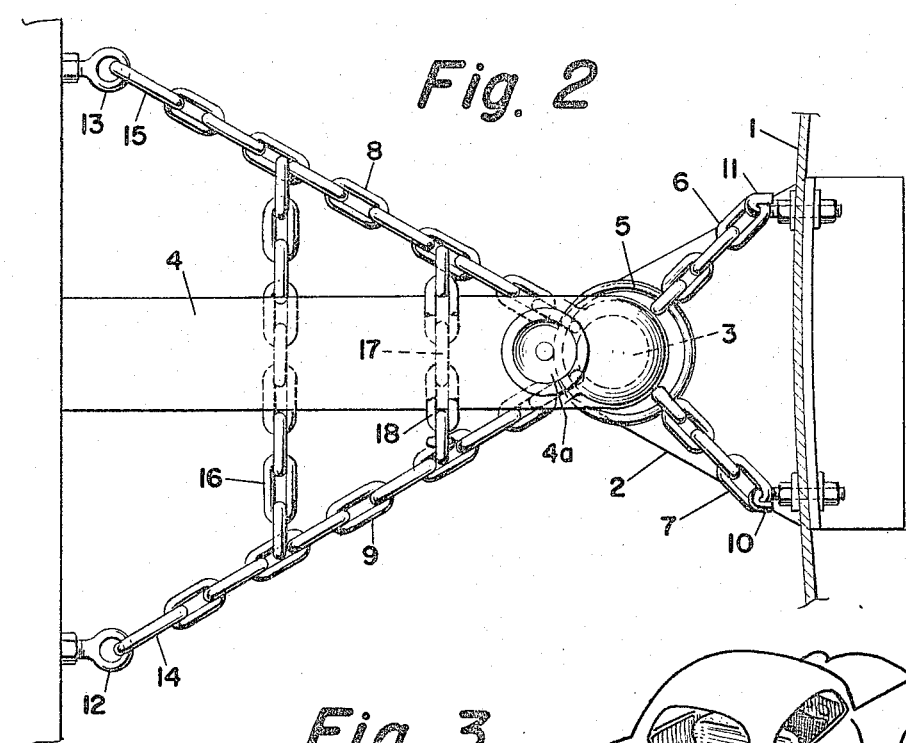
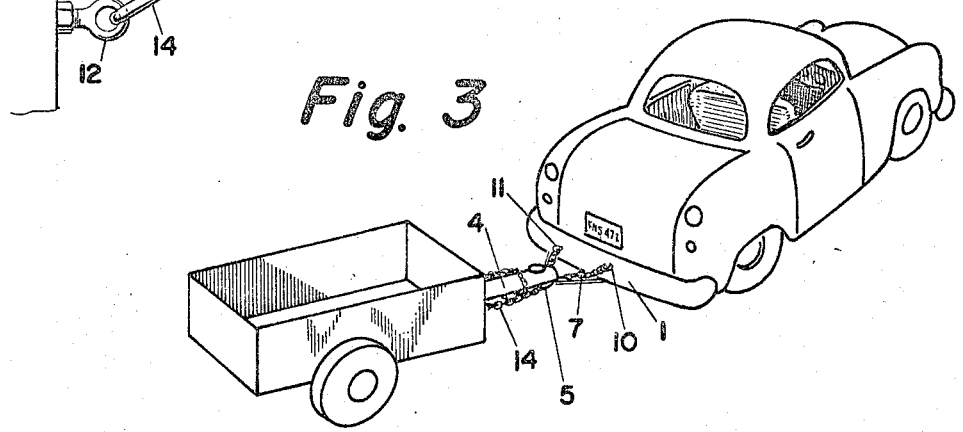

3,265,407
SAFETY CHAIN FOR TRAILERS
Chester Ira Paddock, Box 351, Lakeview, Oreg.; Theodore
R. Conn, administrator of said Chester I. Paddock,
deceased
Filed Sept. 2, 1964, Ser. No. 393,849
6 Claims. (Cl. 280—457)

This invention relates to improved trailer safety chains, and more particularly, to a safety chain which forms a cradle which secures the towing bar in a safe position if the trailer hitch breaks.

When a trailer is hitched to a motor vehicle for towing, it is necessary to provide a safety chain which prevents the trailer from becoming completely detached from the vehicle if the trailer hitch breaks. In some states the provision of such a safety chain is mandatory. Quite often, this safety chain is merely wrapped around the towing bar of the trailer and then wrapped around the bumper of the car. Such an arrangement, and other similar prior art safety chains, have certain deficiencies. One of these is that the trailer towing bar may drop to the roadway, causing a loss of control and great resulting damage. Or, the detached trailer towing bar may fly up, causing a similar loss of control and resulting damage.

An important object of this invention is to provide a safety chain which will maintain the trailer towing bar in a safe position if the trailer hitch breaks. This is accomplished by providing a safety chain including a ring which is positioned over the ball of the trailer hitch on the vehicle. Extending from this ring are four chains. Two of the chains extend to securing means on the rear bumper of the car. The other two chains extend to securing means on the trailer frame. Extending between these latter two chains are cross-chains which form a cradle for the towing bar, to prevent the towing bar from dropping to the roadway. In addition, at least one other cross-chain is fastened over the towing bar so that the towing bar cannot jump out of the cradle formed by the cross-chains.

The foregoing and other objects, features and advantages of the invention will be better understood from the following more detailed description and claims and the drawings in which:

FIG. 1 shows a side view of the trailer hitch and safety chain;

FIG. 2 shows a top view of the trailer hitch and safety chain; and

FIG. 3 shows the motor vehicle, trailer and safety chain.

Referring now to FIG. 1, there is shown the rear portion 1 of a motor vehicle having a trailer hitch attached thereto. This rear portion of the motor vehicle will most commonly be the bumper. The trailer hitch includes a ball 3 on which the socket of the trailer towing bar is positioned.

In accordance with normal practice, a locking mechanism 4a is provided to secure the trailer towing bar to the ball 3 of the trailer hitch.

The safety chain of this invention includes a ring 5 which is positioned on the ball 3 before the towing bar is positioned thereon. Four main chains, 6, 7, 8 and 9 are fastened to the ring 5 and extend therefrom. The two shorter chains, 6 and 7, are attached to J bolts or other suitable securing means 10 and 11 fastened to the rear end of the motor vehicle (FIGS. 1 and 2).

The longer chains 8 and 9 are attached to eye bolts 12 and 13 which are secured to the trailer. The chains may be attached to the eye bolts by means of hooks 14 and 15 at the ends of the chains 8 and 9 (FIGS. 1 and 2).

In order to prevent the towing bar 4 from dropping to the roadway in the event the trailer hitch breaks, two cross-chains 16 and 17 are provided. These cross-chains 16 and 17 extend between the two chains 8 and 9 and are permanently attached to chains 8 and 9. In order to prevent the towing bar from flying up if the trailer hitch breaks, a top chain 18 is provided. This top chain 18 extends from the chain 9 over the trailer towing bar to the chain 8. The top chain 18 is permanently attached at one end to main chain 8. The other end of top chain 18 is provided with a snap hook 19 for attaching the top chain 18 to the main chain 9. It can be seen that the cross-chains 16 and 17 and the top chain 18 form a cradle which holds the trailer towing bar 4 in a safe position in the event that the trailer hitch breaks (FIGS. 1 and 2).

What is claimed is:
1. A safety chain for use with a trailer having a towing bar and a motor vehicle having a trailer hitch comprising:
   a ring for positioning on the trailer hitch,
   four main chains attached to said ring, the first and second of said main chains being adapted for attachment to the rear end of the motor vehicle, the third and fourth of said main chains being adapted for attachment to the trailer,
   at least one cross-chain extending between said third and fourth main chains to support the towing bar in the event the trailer hitch breaks, and
   at least one top chain extending over the towing bar between said third and fourth main chains to maintain the towing bar in its supported position.

2. The combination of:
   a trailer having a towing bar with a socket and two securing means on the front end thereof,
   a motor vehicle having a trailer hitch and two securing means fastened to the outside portion of the rear of said motor vehicle, and
   an auxiliary safety chain comprising:
      a ring for positioning on said trailer hitch,
      said socket being positioned on said trailer hitch over said ring,
      four main chains attached to said ring, the first and second of said main chains being shorter than the third and fourth of said main chains, said first and second main chains being respectively fastened to said securing means on the rear of said motor vehicle, the third and fourth of said main chains being fastened to said securing means on the trailer,
      at least one cross-chain extending between said third and fourth chains and adapted to support said towing bar in the event said trailer hitch breaks, and
      at least one top chain extending over the towing bar between said third and fourth main chains to maintain the towing bar in its supported position.

3. The combination recited in claim 2 wherein said two securing means on said motor vehicle each includes a J bolt fastened to the rear bumper of the motor vehicle.

4. The combination recited in claim 2 wherein the third and fourth of said main chains terminate with a hook, and wherein said securing means on said trailer each includes an eye bolt adapted to receive one of said hooks.

5. The combination recited in claim 2 including two cross-chains permanently secured to said third and fourth main chains and adapted to support said towing bar in the event said trailer hitch breaks and wherein one end of said top chain is permanently secured to said third main chain and the other end of said top chain includes a fastening device for securing said top chain to said fourth main chain.

6. The combination of:
- a trailer having a towing bar with a socket and two eye bolts secured to the front end of said trailer on either side of said towing bar,
- a motor vehicle having a trailer hitch and two J bolts secured to the rear bumper of said motor vehicle on either side of said trailer hitch, and
- an auxiliary safety chain comprising:
    - a ring for positioning on said trailer hitch,
    - said socket being positioned on said trailer hitch over said ring,
    - four main chains permanently attached to said ring, the first and second of said main chains being shorter than the third and fourth of said main chains, said first and second main chains being respectively fastened to said J bolts on the bumper of said motor vehicle, the third and fourth of said main chains being terminated in hooks adapted for attachment to the eye bolts on the front end of said trailer,
    - two cross-chains permanently secured to said third and fourth main chains and extending between said third and fourth main chains to support said towing bar in the event said trailer hitch breaks, and
    - a top chain extending over said towing bar between said third and fourth main chains, one end of said top chain being permanently secured to said third main chain, the other end of said top chain having a snap fastening device for fastening said top chain to said fourth main chain.

References Cited by the Examiner

UNITED STATES PATENTS

| | | | |
|---|---|---|---|
| 666,218 | 1/1901 | Ebersole | 280—458 |
| 2,196,115 | 4/1940 | Jacobson | 280—457 |
| 2,554,801 | 5/1951 | Vogel | 280—456 |
| 2,815,225 | 12/1957 | Barcafer | 280—457 |
| 2,937,885 | 5/1960 | Skow | 280—457 |
| 3,132,878 | 5/1964 | DePuydt et al. | 280—457 |

FOREIGN PATENTS 1,006,657   1/1952   France.

LEO FRIAGLIA, *Primary Examiner.*